United States Patent [19]

Clark

[11] 4,303,131

[45] Dec. 1, 1981

[54] COMPRESSED-GAS-OPERATED RECIPROCATING PISTON DEVICES

[75] Inventor: Malcolm Clark, Helston, England

[73] Assignee: Compair Construction and Mining Ltd., Cornwall, England

[21] Appl. No.: 125,090

[22] Filed: Feb. 27, 1980

[51] Int. Cl.$^3$ .............................................. B23B 45/16

[52] U.S. Cl. .............................. 173/134; 173/DIG. 2; 173/168; 181/230

[58] Field of Search ................. 173/168, 134, DIG. 2; 181/230; 92/144, 169

[56] References Cited

U.S. PATENT DOCUMENTS

| | | | |
|---|---|---|---|
| 2,128,742 | 8/1935 | Fuehrer | 121/1 |
| 3,223,181 | 12/1965 | Price | 173/134 X |
| 3,263,770 | 8/1966 | Alm | 181/36 |
| 3,446,294 | 5/1969 | Bailey et al. | 173/168 X |
| 3,554,316 | 1/1971 | Judd et al. | 173/DIG. 2 X |
| 3,559,753 | 2/1971 | Meri et al. | 181/230 X |
| 3,635,299 | 1/1972 | Hayes | 173/DIG. 2 X |
| 3,815,705 | 6/1974 | Bennett | 181/230 |
| 3,847,232 | 11/1974 | Klushin et al. | 173/168 |
| 4,189,917 | 2/1980 | Gunning | 173/DIG. 2 X |

FOREIGN PATENT DOCUMENTS 496454 11/1938 United Kingdom .

*Primary Examiner*—Ronald Feldbaum

*Attorney, Agent, or Firm*—Watson, Cole, Grindle & Watson

[57] ABSTRACT

A compressed-gas-operated reciprocating-piston device, e.g. a concrete breaker, rock drill or chipping hammer, has a cylinder component of composite construction, comprising a rigid inner metal tube in which the piston reciprocates and a moulded outer sleeve of rubber or plastics material, e.g. polyurethane, which surrounds the tube over the majority of its length and is bonded thereto. The sleeve has three integral moulded longitudinal ribs in which are moulded longitudinal passages for transmission of compressed air to the cylinder interior. An outer tubular muffler of rubber or plastics material surrounds the composite cylinder component and defines a sound-reducing path for exhaust gas from the cylinder to the atmosphere. The exhaust gas is discharged into two spaces defined between two pairs of adjacent ribs of the sleeve within the muffler, these two spaces forming part of an expansion chamber in the muffler. This expansion chamber communicates with the atmosphere via a restriction, a second expansion chamber and a final duct leading to the exhaust opening in the muffler wall. The final duct is formed on the thickness of the muffler wall itself.

17 Claims, 9 Drawing Figures

COMPRESSED-GAS-OPERATED RECIPROCATING PISTON DEVICES

BACKGROUND OF THE INVENTION

This invention relates to compressed-gas-operated devices of the reciprocating-piston type. The invention is particularly although not exclusively applicable to percussive tools such as pneumatically-operated concrete breakers, rock drills, chipping hammers and the like.

In such devices a piston is caused to reciprocate in a cylinder and to do useful work during or at the end of its forward working stroke, for example by impacting against an anvil or the shank of a tool bit. In order to achieve reciprocation of the piston, compressed air or other pressure fluid medium has to be directed alternately to opposite ends of the cylinder so as to move the piston. This operating fluid is usually conducted through longitudinal passages formed in the wall of the cylinder. The usual method of construction of these cylinders has been by casting or forging out of high quality case-hardenable steel or cast iron, and subsequently machining the main cylinder bore and the fluid transfer passage(s). This method of construction results in a component which is both heavy and expensive.

One object of the present invention is to provide a compressed-gas-operated reciprocating-piston device having an improved construction of cylinder component, which is used in conjunction with a surrounding tubular muffler and produces an improved sound-attenuating effect on the exhaust gas discharged from the device in operation, as well as on the general operating noise.

BRIEF SUMMARY OF THE INVENTION

According to the present invention, a compressed-gas-operated reciprocating-piston device has a composite cylinder component comprising a rigid inner metal cylinder tube in which the piston reciprocates in use, and an outer sleeve moulded of rubber or synthetic plastics material and surrounding and bonded to the metal cylinder tube, the sleeve overlying the entire outer circumferential surface of the major part of the length of the tube, and the sleeve being formed on its outer surface with a plurality of longitudinally-extending outwardly-projecting integrally-moulded ribs spaced apart around the circumference of the sleeve, the device further including an outer tubular muffler made of rubber or synthetic plastics material which surrounds the ribbed sleeve, there being formed within the interior of the muffler, first and second muffler chambers which are in communication with one another via a restricted-flow throat, referred to as the restriction, the cylinder component being formed with at least one gas discharge port in its wall which opens into the first muffler chamber, and the second muffler chamber communicating with the muffler exhaust opening, whereby exhaust gas discharged from the cylinder interior through the gas discharge port passes in sequence via the first muffler chamber, the restriction and the second muffler chamber before reaching the ambient atmosphere via the muffler exhaust opening.

The second muffler chamber may include as a part of its volume a space defined between the muffler and the sleeve and bounded by a further pair of adjacent ribs of the sleeve, between which further pair of ribs no discharge port opens from the interior of the cylinder, and the general direction of exhaust gas flow in the said space is opposite to that in the first muffler chamber.

In one construction, the moulded sleeve of the cylinder component has three of the said integrally-moulded ribs and has two of the said gas discharge ports opening into the first muffler chamber between two different pairs of adjacent ribs, the third pair of adjacent ribs comprising the said further pair of ribs which defines the said space.

A longitudinally-extending elongate passage may be formed in the interior of one of the ribs, said passage constituting a transfer passage for supplying compressed gas to one end portion of the interior of the cylinder tube.

The preferred material of the moulded sleeve, and also of the surrounding muffler, is polyurethane. Polyurethane is already used widely in the construction of muffler cylinders for pneumatic tools, and has properties making it eminently suitable for the purpose of the present invention, notably its soft, yielding moulded surfaces which afford good sound-absorbing and sound-damping properties, reducing internal sound reflections. To ensure intimate bonding of the polyurethane moulding material with the inner metal tube, the external surface of the latter should be treated with a suitable bonding agent.

The crests of the longitudinal ribs on the moulded sleeve may act as radial locating means for the muffler.

In one construction, the muffler wall may include a longitudinally-extending portion of increased depth which protrudes laterally inwardly into the second muffler chamber and is formed with an internal longitudinally-extending passage which opens at one end into the said space bounded by said further pair of ribs and leads as its other and downstream end to the muffler exhaust opening, the general direction of exhaust gas flow along the second muffler chamber being opposite to that along the said passage.

DESCRIPTION OF THE DRAWINGS

The invention may be carried into practice in various ways, but two specific embodiments will now be described by way of example only and with reference to the accompanying drawings, in which.

Figure 1:
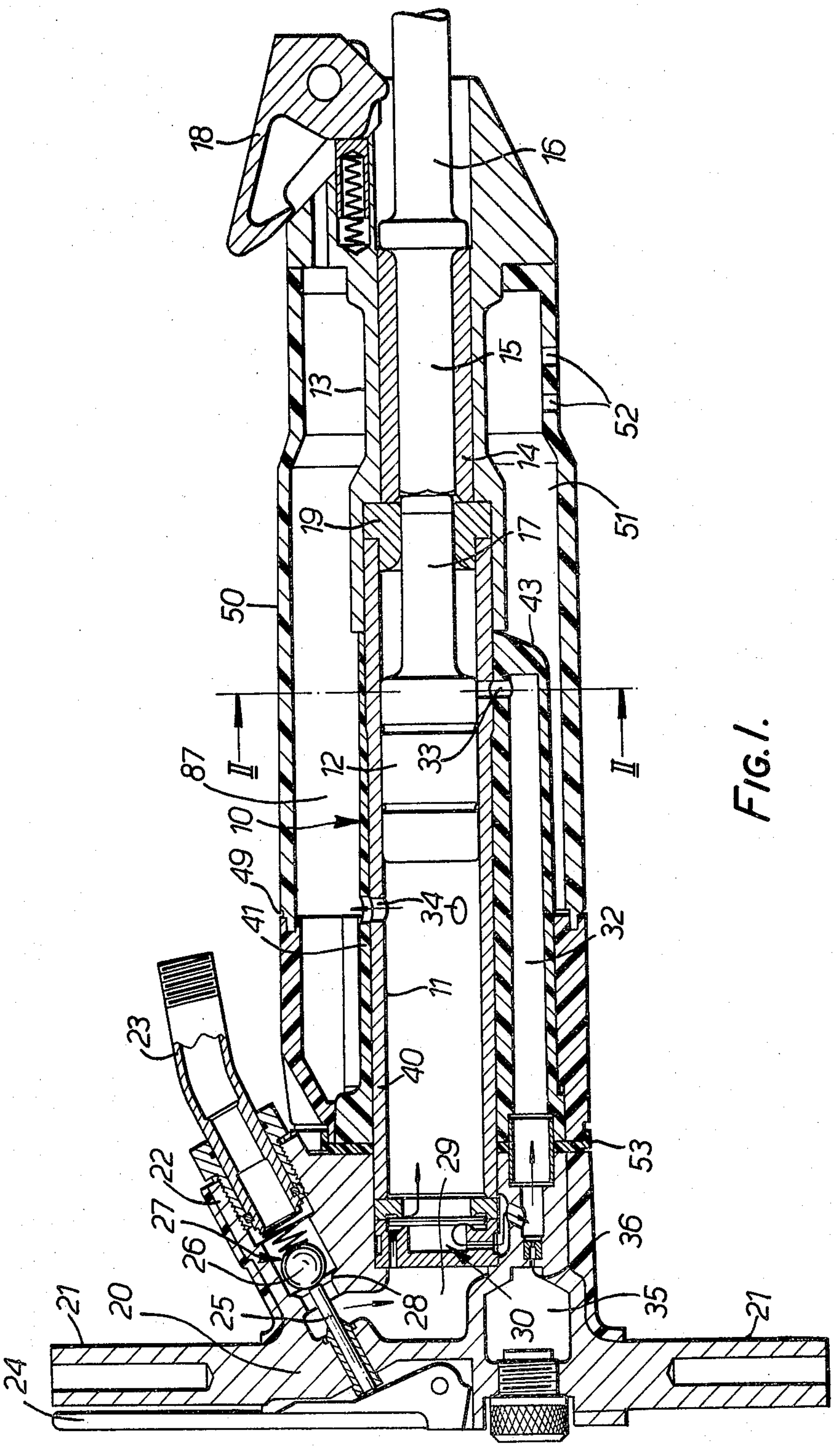
FIG. 1 is a section taken through the longitudinal axis of a percussive tool.
Figure 2:
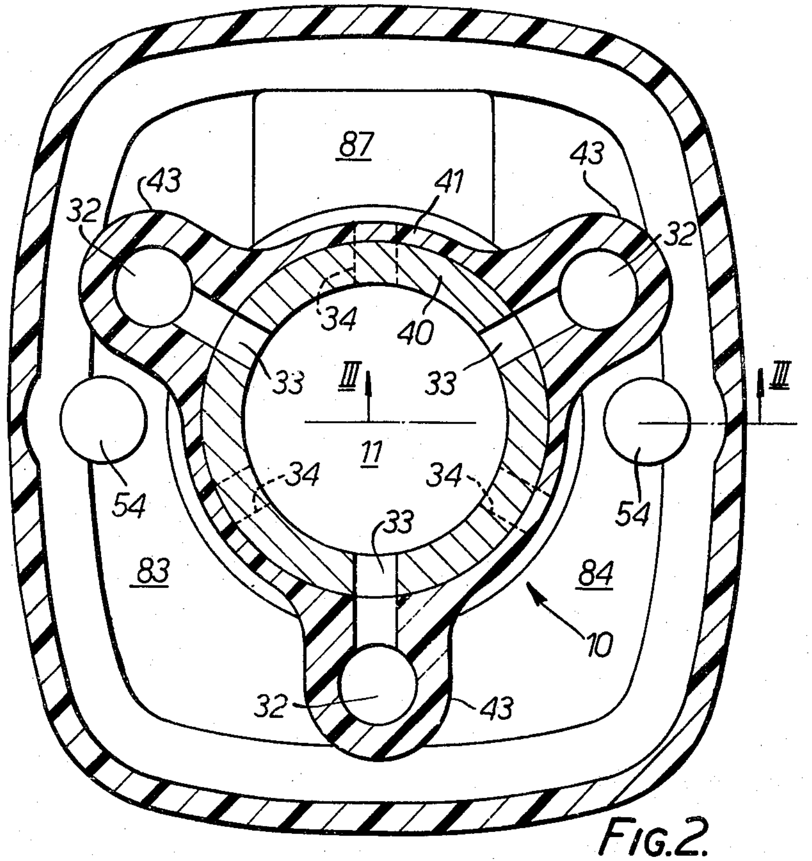
FIG. 2 is a cross-section on the line II—II of FIG. 1.
Figure 3:
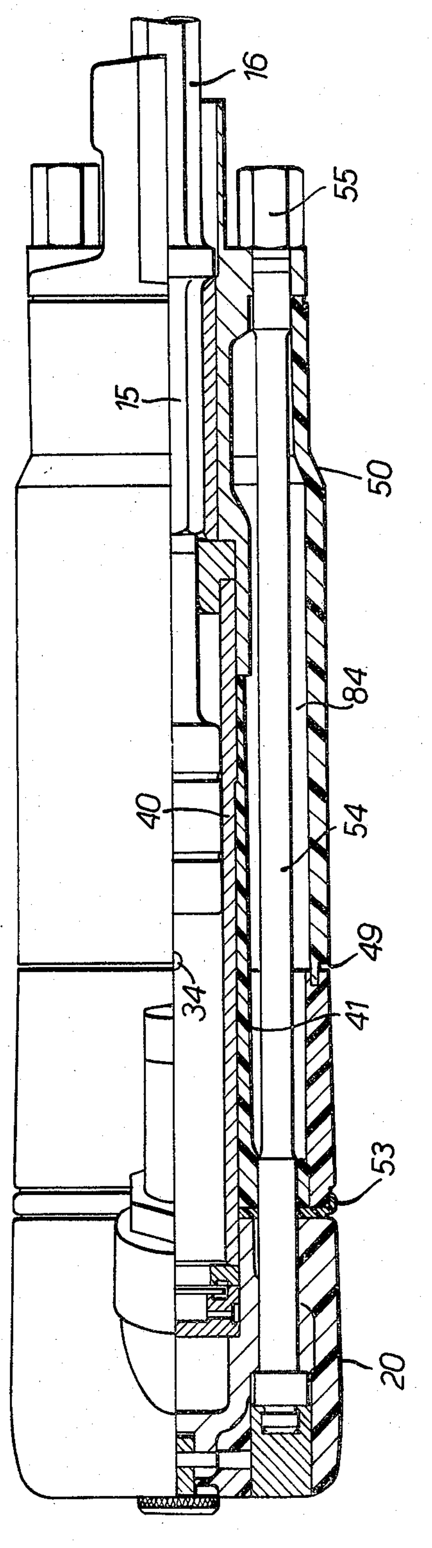
FIG. 3 is a side view in part-section on the line III—III in FIG. 2.

The percussive tool shown in FIGS. 1 to 3 is of a construction described in Reginald O. Godolphin's copending Application Ser. No. 125,085 of even date, and does not embody the present invention. It comprises a composite cylinder 10 in whose bore 11 a hammer piston 12 reciprocates. At its lower end the cylinder 10 carries a fitting 13 with a liner sleeve 14 which slidably receives the shank 15 of a tool bit 16, and the hammer piston 12 has a stem 17 which impacts against the shank 15 of the tool bit at the end of each working stroke of the piston.

A spring-loaded latch 18 retains the tool shank 15 in the sleeve 14. A sleeve 19 at one end of the cylinder 10, that which is normally lower in use, seals around the piston stem 17 and traps air in the cylinder to cushion the piston 12 at the end of its working stroke. At the other end of the cylinder 10, which is normally uppermost in use, is a handle fitting 20 with handles 21, an air inlet connection 22 into which is fitted an inlet stem 23 to which is connected a pressure hose (not shown) connected to a supply of compressed air, and a pivoted operating trigger 24 which when depressed advances a plunger rod 25 to lift the ball 26 of an inlet valve 27 off its seating 28, the inlet valve 27 controlling the admission of compressed air into a chamber 29 in the handle fitting 20. A pressure-responsive distribution valve assembly 30 of conventional plate type controls the admission of compressed air from the chamber 29 alternately to opposite ends of the cylinder bore 11 to cause the reciprocating motion of the hammer piston 12 in the cylinder 10, the air being transmitted to the lower end of the cylinder via longitudinal passages 32 and radial passages 33 in the wall of the cylinder for returning the piston after each working stroke. A number of discharge ports 34, in this case three, in the wall of the composite cylinder 10 are controlled by the piston 12 and release the compressed air from the upper and lower ends of the cylinder towards the end of the working and return strokes respectively of the piston. The air is discharged through the or each discharge port 34 into an expansion chamber in the interior of an external tubular muffler 50 having final exhaust ports 52 in its wall, as will be described below. An oil reservoir 35 in the handle fitting 20 releases lubricating oil through a bleed orifice 36 into the stream of pressure air in one of the passages 32 for lubricating the piston/cylinder bearing surfaces.

The cylinder 10 is of composite construction, and comprises an inner steel tube 40 of circular section with a synthetic plastics outer sleeve 41 bonded to its outer surface. In this embodiment the outer sleeve 41 is moulded from polyurethane polymer, and the air transfer passages 32 are formed in the thickness of the moulded sleeve 41 itself. As indicated in FIG. 2 there are three of the passages 32 respectively formed as moulded cavities in protruding integral longitudinal rib portions 43 of the sleeve 41. The polyurethane sleeve 41 extends over the majority of the length of the steel tube 40, between the handle fitting 20 and the lower fitting 13.

In order to provide a high degree of exhaust air muffling, an outer plastics muffler 50 is mounted around the cylinder 10. The muffler could be formed as a unitary moulding integral with the plastics sleeve 41, but in this embodiment a separate two-part tubular cover or muffler 50 surrounds the cylinder 10 and the fitting 13, the lower part of the muffler 50 defining an annular space 51 around the fitting 13 and beyond the ends of the ribs 43, the final exhaust ports 52 leading from the space 51 into the ambient atmosphere. As shown, the or each radial exhaust port 34 (three ports 34 are shown in FIGS. 1–3) leads through the composite cylinder wall into a segmental region 83, 84 or 87 between two adjacent ribs 43, communicating with the annular space 51 and forming therewith an expansion chamber in the muffler 50 by which the pressure of the exhaust air discharged through the port 34 will be reduced, and its pulsations damped, before it is discharged through the final exhaust ports 52. The two-part muffler 50 is also made of polyurethane plastics material with an annular spigot joint 49 between its two portions. The upper part of the muffler 50 is located by the upper end portions of the three ribs 43, as shown in FIGS. 1 and 2, and by a flanged ring 53 trapped between the end of the moulded sleeve 41 and the handle fitting 20 whilst the lower part of the muffler 50 locates around the lower fitting 13. A pair of longitudinal tie rods 54 (FIGS. 2 and 3) extend within the muffler 50 and are anchored at their ends respectively in the fittings 20 and 13, and can be tensioned by means of nuts 55 screwed onto their screwthreaded lower ends.

The composite cylinder 10 of the tool shown in FIGS. 1 to 3 is manufactured as follows. Firstly, the cylinder liner tube 40 is manufactured by conventional fabrication techniques as a rigid steel tube of circular or other regular cross-section, having inside dimensions of correct size to accept the piston 12, and outside dimensions which need not be critically sized. The exterior of the steel tube is treated with a suitable bonding agent, and the tube is then placed in a mould whose cavity has the desired outer shape of the sleeve 41 and which contains a series of rods or cores positioned where the compressed air transfer passages are required to be. The plastics moulding material, in this case polyurethane, is then introduced into the mould cavity through a suitable pouring opening, until it surrounds the steel tube and the rods or cores and fills the mould cavity, and is then allowed to cure. After curing the composite cylinder is removed from the mould and the rods or cores are withdrawn, leaving the completed composite cylinder assembly available for immediate assembly into the tool.

Figure 4:
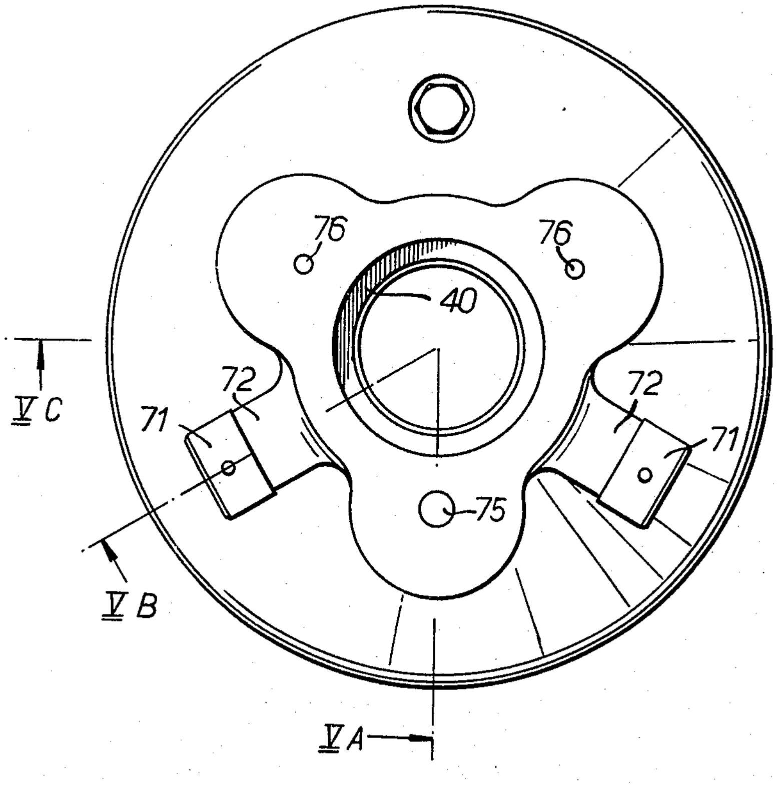
FIG. 4 is a plan view of a mould for casting the composite cylinder of the tool of FIGS. 1 to 3.
Figure 5:
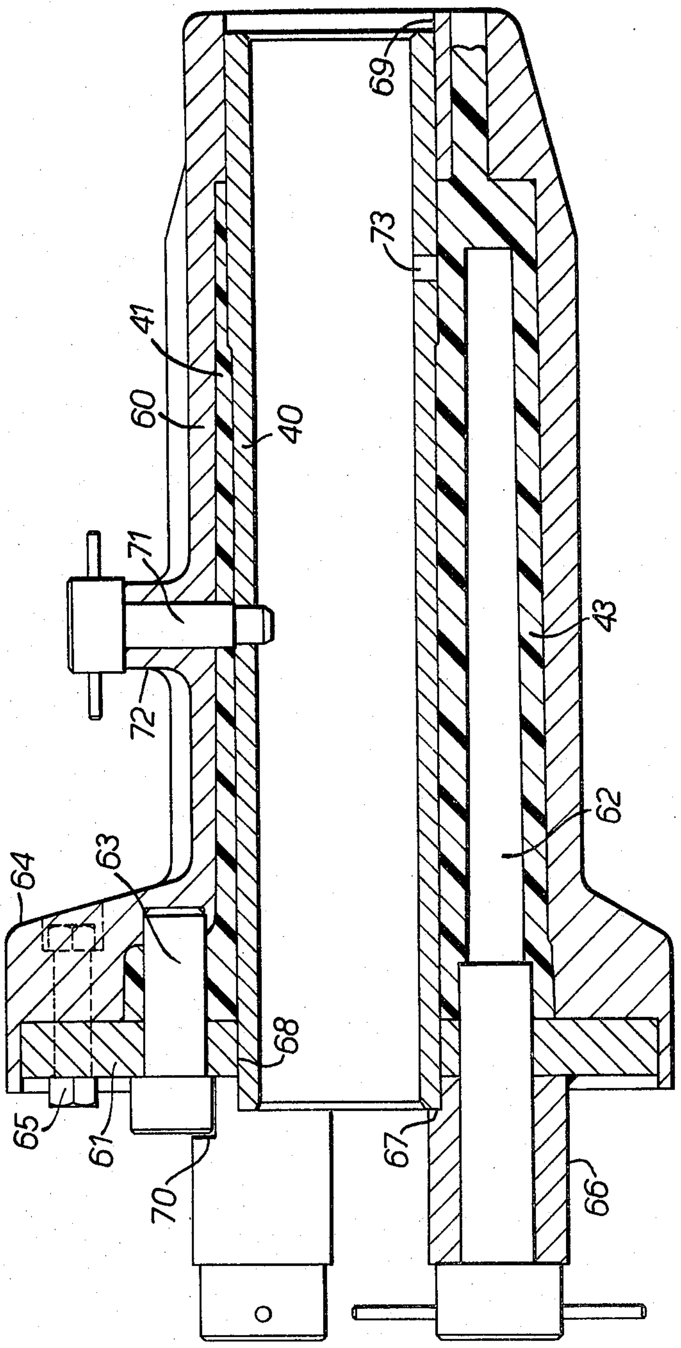
FIG. 5 is a combined longitudinal section on the lines VA, VB and VC in FIG. 4.

FIGS. 4 and 5 show a suitable mould for use in casting the composite cylinder 10 of the tool of FIGS. 1 to 3. The mould is in two main parts, namely an open-ended tubular mould portion 60 and a locating plate 61 which closes and seals the lower end of the mould portion 60 and serves to support the steel liner tube 40, three cores 62 for the air passages 32 and two cores 63 for the apertures to receive the tie rods 54. The tubular mould portion may be made of any suitable rigid material, for example glass-fibre-reinforced plastics materials for experimental use or short production runs, or steel or aluminium for extended production. The locating plate 61 is made of steel, and is bolted to the flange 64 of the tubular mould portion 60 by three fastening bolts 65. Bushes 66 for locating the three air passage cores 62 are welded to the lower face of the locating plate 61, and are formed with steps 67 for supporting and axially locating the lower end of the steel liner tube 40 (which slides in a central aperture 68 in the plate 61 and in the open upper end 69 of the mould portion 60), and with steps 70 for supporting and axially locating the cores 63 for the tie-rod apertures. A set of core pins 71 is provided (in this case two only are shown) inserted in radial bosses 72 formed in the wall of the tubular portion 60, for moulding the exhaust ports 34. The core pins 71 extend into drilled apertures in the wall of the liner tube 40.

The passages 33 connecting the interior of the liner cylinder to the three air passages 32 are formed in a different way. A temporary plug of cured polyurethane or other soft material is inserted into each of three previously-drilled holes 73 in the liner tube 40, so as to prevent the escape of liquid moulding material into the liner tube during the moulding operation. After the cure of the main mass of plastic in the mould, the temporary plugs and the portions of the plastic wall of the moulding attached thereto are drilled through from the inner bore of the cylinder by means of an angle-head drill. This operation forms the passages 33 which connect the bore of the liner tube 40 to the three air passages 32.

The interior of the tubular mould portion 60 corresponds in shape to the exterior of the composite cylinder 10, providing the three rib portions 43. At its upper end the tubular portion 60 defines a runner passage 75 and two risers 76.

The procedure for moulding is as follows. The outer surface of the steel liner tube 40 is first treated with a bonding agent. Where the moulding material for the sleeve 41 is to be polyurethane, the bonding agent is preferably that marketed under the trade name THIXON by The Whittaker Corporation, Dayton Chemical Products Division, of West Alexandra, Ohio 45381, United States of America, this material ensuring intimate and adequate bonding of the plastics moulding material to the steel tube.

The inner surfaces of the mould portion 60 and those surfaces of the core pins 62, 63, 71 and of the locating plate 61 which will come into contact with the moulding material are treated with a release agent, for example a silicone-based material or the film sold under the Registered Trade Mark TEFLON TFE of the Du Pont Company. The liner tube 40 and core pins are then inserted in position in the mould, and casting can take place.

A preferred grade of plastics moulding material is the polyurethane rubber sold under the trade name ADIPRENE L-100 and available from the Du Pont Company, Elastomer Chemicals Department, Wilmington, Del. 19898, U.S.A., who also supply the release agent TEFLON TFE film. ADIPRENE L-100 when mixed with a curing agent such as MOCA (Registered Trade Mark of the Du Pont Company and also available from them) yields vulcanizates in the hardness range 88 to 92 (durometer A). The liquid polyurethane monomer ADIPRENE L-100 is mixed with any desired colouring pigment and with the MOCA, in accordance with the instructions issued by the manufacturers, and when thus prepared it is poured into the mould cavity via the runner passage 75 and allowed to fill the cavity completely until excess material issues from the riser passages 76. Curing takes place partly in the mould which is placed in an oven at 100° C. for about 1 hour, after which the moulding on the liner tube 40 is removed from the mould and the cure is completed at 100° C. for a minimum of a further 3 hours in the oven. Excess runner and riser plugs are trimmed off after the cure has been completed.

Polyurethane is a preferred material for use in making the plastics sleeve 41 and two-part muffler 50, being already used widely in the construction of muffler cylinders for compressed-air percussion tools. Polyurethane has the desirable properties that are required of a tool cylinder, in that it is easily pourable, resists damage, is suitable for use over a wide range of temperatures and readily bonds to steel, and is a soft, resilient material with good sound-absorbing properties.

However other plastics materials or rubber may also be suitable for the manufacture of the plastics sleeve 41. For example glass-fibre-reinforced resin may be used in some cases. The method of construction of the composite cylinder 10 may then differ from that described above, in that a manual lay-up method would probably be more appropriate than pour moulding, the inner steel tube and the rods or cores for the transfer passages being held in place in a jig and the glass mat and resin being applied manually and shaped externally in a mould, in the usual way.

The design of the cylinder component of the percussion tool shown in FIGS. 1 to 3 is comparatively simple and requires only three air transfer passages 32 to supply the return air to the lower end of the cylinder 10 for effecting the return stroke of the piston.

Instead of the separate two-part muffler 50 shown in FIGS. 1 to 3, the muffler cylinder and the outer sleeve of the composite tool cylinder 10 may be constructed as a single integral moulding of the polyurethane or other plastics material, e.g. by moulding in a single operation in a mould having the necessary cores to shape all the passages and the muffler chamber.

It has been found that the composite cylinder and muffler arrangement constructed as described above with reference to FIGS. 1 to 3 has the advantage of improved noise suppression when the tool is in use. Because of the intimate bonding between the plastic sleeve and the inner steel tube, the characteristic "ring" of the cylinder when struck is almost entirely eliminated. Furthermore, the transfer passages for the compressed air are completely bounded by the plastics material of the ribs in which they are moulded, giving a degree of resilience to the passage walls which provides in itself a sound-absorbing effect, whilst the interior of the muffler into which the used air discharged from the cylinder first passas is bounded mainly by plastics material which, having a softer surface than steel or cast iron, is better able to suppress the noise-producing pulsations in the exhaust air. The three ribs 43 which protrude into the expansion chamber within the muffler have the effect of increasing the surface area of that chamber for a given volume, thereby increasing the sound absorbing effect. The characteristics of polyurethane are found to be particularly beneficial in these respects. The use of the expansion chamber into which the exhaust air is initially released from the cylinder interior, also helps to attenuate the sound energy of the exhaust air before its final discharge into the atmosphere.

Figure 6:
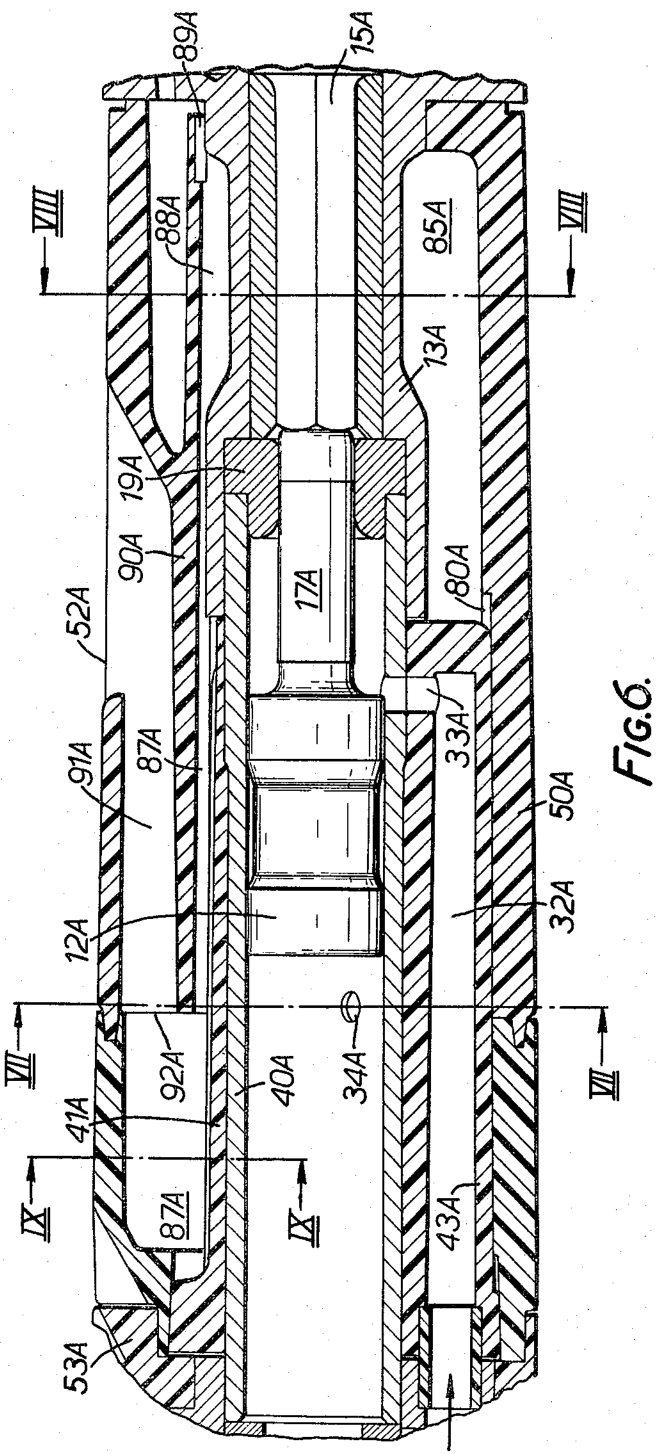
FIG. 6 is a sectional view similar to FIG. 1 of the central part only of a modified percussive tool embodying the invention, showing the composite cylinder, the surrounding muffler and the gas chambers in the muffler interior.
Figure 7:
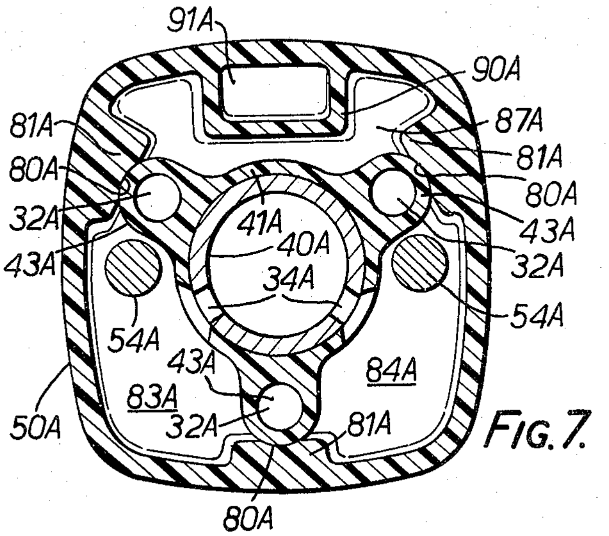
FIGS. 7, 8 and 9 are respectively cross-sections on the lines VII—VII, VIII—VIII and IX—IX in FIG. 6.

FIGS. 6 to 9 show an embodiment of the invention, in which the internal spaces defined within the muffler are so shaped and connected as to provide a double-expansion-chamber silencing system, through which the used air discharged from the cylinder passes to the final exhaust opening to atmosphere. In FIG. 6 only the central portion of the percussive tool are shown, the upper part with the handle, air inlet, and distributor valve, and the lower end with the tool-retaining latch, being omitted but being similar to the corresponding parts shown in FIGS. 1 to 3. Parts of the embodiment of FIGS. 6 to 9 which correspond to parts shown in FIGS. 1 to 3 are given the same reference numerals but qualified by the letter 'A'.

Figure 8:
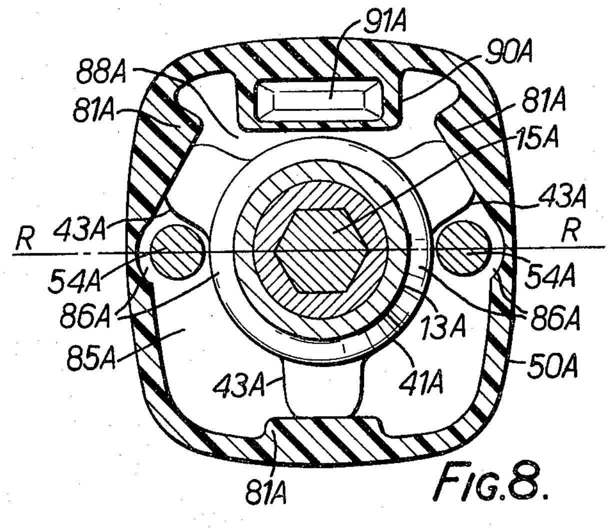
Figure 9:
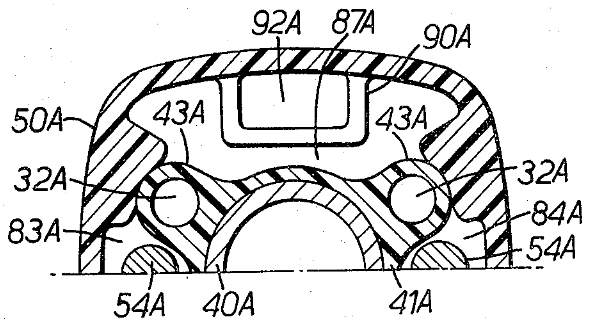

In the embodiment of FIGS. 6 to 9, the steel liner tube 40A is enclosed within a moulded polyurethane sleeve 41A bonded to its outer surface as in FIGS. 1 to 3. The sleeve 41A is made by a moulding process similar to that described above for the sleeve 41, using a suitably modified mould, and using the moulding materials previously indicated. The three integral longitudinal ribs 43A contain the three moulded transfer passages 32A by which compressed air from the distributor valve is admitted into the cylinder on the lower side of the piston 12, as before. In this case however the crests of the three ribs 43A are in locating engagement with the inner surface of the two-part moulded polyurethane muffler 50A over the whole of the lengths of the ribs, lying in shallow recesses 80A formed in elongate inwardly-projecting thickened portions 81A of the walls of the two parts of the muffler 50A, instead of being in locating engagement with the upper part only of the muffler but spaced slightly from the lower part of the muffler along their lower portions as shown in FIGS. 1 and 2. The three ribs 43A thus define with the body of the sleeve 41A and with the inner surface of the muffler longitudinally-extending spaces 83A, 84A and 87A. Each of two of these spaces 83A and 84A has one of the radial discharge ports 34A opening into it between two ribs 43A, and is otherwise entirely closed except at the lower end where the ribs 43A terminate. Below the ribs 43A these two passages 83A, 84A open into a space 85A within the muffler 50, on one side of the rods 54A and fitting 13A. The cross-section of the spaces 85A, is shown in FIG. 8. The spaces 83A, 84A and 85A communicate with one another at the lower ends of the ribs 43A, and together form a first expansion chamber having no direct access to the atmosphere. From the space 85A the discharged air leaves the first expansion chamber and passes through a restriction 86A into a second expansion chamber on the other side of the tie rods 54A. The restriction occurs on the line R—R in FIG. 8 and is created by the rods 54A themselves, which define restricted areas 86A on either side of each rod 54A between itself, the fitting 13A and the wall of the muffler 50A. Exhaust air at the reduced pressure in the first expansion chamber passes through the restriction 86A suffering a further pressure drop on entry into the second expansion chamber on the other side of the rods 54A. The second expansion chamber is formed by a space 88A defined between the fitting and the muffler wall, together with the third space 87A defined between the sleeve 41A, two adjacent ribs 43A of the sleeve, and the muffler wall 50, spaces 87A and 88A communicating with one another directly at the ends of the ribs 43A. The cross-section of space 88a is shown in FIG. 8, and that of space 87A in FIGS. 7 and 9. It will be seen that the wall of the muffler 50A is formed with a longitudinally-extending portion 90A of increased depth which protrudes inwardly into the spaces 88A and 87A and in whose interior a final exhaust duct 91A is moulded. The inlet 92A to the final exhaust duct 91A is formed at the upper end of the wall portion 90A and communicates with the space 87A, and the downstream end of the duct 90A leads directly to the final exhaust duct 52A. There is no discharge port 34A leading from the cylinder 40A into the space 87A.

Thus the used working gas discharged from the interior of the cylinder tube 40A through the two discharge ports 34A enters the first expansion chamber formed by the spaces 83A, 84A and 85A and suffers a first pressure drop. The exhaust gas travels to the right in FIG. 6 into the space 85A and thence passes through the restriction 86A into the space 88A undergoing a further pressure drop as it enters the second expansion chamber. The exhaust gas travels along the second chamber to the left in FIG. 6 from space 88A into space 87A, leaving the second expansion chamber through the inlet 92A and passing along the duct 91A to be finally discharged to atmosphere through the outlet 52A.

A drain hole 93A is provided at the lower end of the space 88A to allow moisture and oil to drain out.

The muffler thus provides a two-stage expansion system for the exhaust gases before they are released into the atmosphere, the two expansion chambers being connected in series via the restriction 86A. With this arrangement the pressure and velocity of the exhaust gases are progressively reduced in the succeeding expansion chambers and the energy of their pulsations is dissipated partly by the two-stage expansion and partly by the sound absorption effect of the polyurethane sleeve 41A and muffler 50A, whose comparatively soft, resilient surfaces provide the majority of the wall surfaces of the expansion chambers. Moreover the provision of the three ribs 43A which protrude into the spaces 83A, 84A and 87A has the effect of substantially increasing the surface area of soft, resilient material bounding the expansion chambers, in proportion to their volumes, thereby correspondingly increasing the sound absorption characteristic. The comparatively soft, resilient surfaces damp internal sound reflections, and reduce the characteristic "ring" of the metal liner tube 40A and fitting 13A due to impact vibration. Whilst in the embodiment of FIGS. 6 to 9 the metal tie rods 54A are utilised to form the restriction between the two muffler expansion chambers, it will be understood that it is also possible to form this restriction in some other way, e.g., by moulded formations on the inner surface of the muffler wall which protrude inwardly towards the fitting 13A, the tie rods 54A being located elsewhere.

The values of the successive pressure drops which the exhaust gas undergoes as it travels to the final exhaust outlet 52A, depends in part upon the volumetric proportions of the working interior spaces in the cylinder on either side of the piston to the two expansion chambers. If the cylinder working volumes (swept volume plus clearance volume, at each end of the cylinder) are designated as C, and the volume of the first and second expansion chambers as E1 and E2, a rough and ready rule for achieving good sound-attenuating results in practice is that the ratio C:E1:E2 should be in the range between 1:5:3 and 1:8:5. In one example constructed in accordance with FIGS. 6 to 9 the values were $C=2.1\times10^5$ mm$^3$ $E1=1.43\times10^6$ mm$^3$ $E2=7.7\times10^5$ mm$^3$ giving a ratio of

1:7:3:6 i.e., within the range indicated above.

The minimum cross-sectional gas flow areas of the ports or passages which interconnect these three volumes, and their relative proportions, are also important for securing good noise reduction. The applicant has found that the proportions of the total area of flow cross-section of the gas discharge ports 34A to that of the restriction 86A and that of the final exhaust duct 91A should preferably be in the range between 1:5:3 and 1:8:5. In the measured example referred to in the preceding paragraph, the total flow area of ports 34A was 160 mm$^2$, that of the restriction 86A at minimum flow section was 1240 mm$^2$, and that of the duct 91A at minimum flow section was 640 mm$^2$. This gave a ratio of approximately 1:8:4, i.e., within the range indicated.

The use of the moulded plastics sleeve 41A as the outer part of the composite cylinder component reduces the resonant vibrations of the steel tube 40A caused by repeated impact, as already mentioned, as well as facilitating the economical construction of the cylinder component. The composite cylinder component 40A can be made by the method described more quickly and economically than an all-metal component made by casting or forging and subsequent machining, and will usually be lighter in weight. While the internal dimension of the metal tube 40A must be accurately controlled to receive the piston, the outer surface of the tube need not be finished to a critical size. Moreover, the bore of the metal liner tube 40A need not be of circular section as described and illustrated, but could be of oval or other suitable section for use with a piston of corresponding shape. Whilst the bore of the metal liner tube will usually be of uniform cross-section along its length this is not essential, since a stepped bore could be used in conjunction with a piston having two or more portions of different diameters/sections which respectively slide in different sections of the stepped bore.

As previously mentioned, the outer muffler 50A may be moulded integrally with the moulded ribbed sleeves 41A. It is however also possible, in the case of a two-part muffler as described, for one part only of the muffler, e.g. the upper part to be moulded integrally with the sleeve, the lower part of the muffler being separate and separately-fitted. Again, a one-piece muffler could be used in place of the two-piece construction shown, and could either be moulded integrally with the sleeve or be separate and fitted around the sleeve.

Variations are also possible in the arrangement of compressed-air transfer passages in the ribs of the sleeve. As described and illustrated each rib 43A has a transfer passage 32A moulded in it and communicating with the distribution valve at its other end. It is also possible for one or more of these cavities moulded in the ribs (but not all) to be permanently closed at the upper end whilst still communicating through a radial passage with the cylinder at its other end, so as to serve as a pneumatic cushion connected to the lower working space in the cylinder below the piston. All these variations are within the broad scope of the present invention.

What I claim as my invention and desire to secure by Letters Patent is:

1. A compressed-gas-operated reciprocating piston device, which includes a composite cylinder component comprising a rigid inner metal cylinder tube in which the piston reciprocates in use and an outer sleeve moulded of polymerized plastics material and surrounding and bonded to the metal cylinder tube, the sleeve being in contact with the entire outer circumferential surface of the major part of the length of the tube, and the sleeve being formed on its outer surface with a plurality of longitudinally-extending outwardly-projecting integrally-moulded ribs spaced apart around the circumference of the sleeve, the device further including an outer tubular muffler made of polymerized plastics material which surrounds the ribbed sleeve, there being formed within the interior of the muffler, first and second chambers which are in communication with one another via a restricted-flow throat, referred to as the restriction, the cylinder component being formed with at least one gas discharge port in its wall which opens into the first muffler chamber, and the second muffler chamber communicating with the muffler exhaust opening, whereby exhaust gas discharged from the cylinder interior through the gas discharge port passes in sequence via the first muffler, the restriction and the second muffler chamber before reaching the ambient atmosphere via the muffler exhaust opening.

2. A reciprocating-piston device as claimed in claim 1, in which the second muffler chamber includes as a part of its volume a space defined between the muffler and the sleeve and bounded by a further pair of adjacent ribs of the sleeve, between which further pair of ribs no discharge port opens from the interior of the cylinder, and in which the general direction of exhaust gas flow in the said space is opposite to that in the first muffler chamber.

3. A reciprocating-piston device as claimed in claim 2, in which the moulded sleeve of the cylinder component has three of the said integrally-moulded ribs and has two of the said gas discharge ports opening into the first muffler chamber between the two different pairs of adjacent ribs, the third pair of adjacent ribs comprising the said further pair of ribs which defines the said space.

4. A reciprocating-piston device as claimed in claim 3, in which at least one longitudinally-extending elongate passage is formed in the interior of one of the ribs, said passage constituting a transfer passage for supplying compressed gas to one end portion of the interior of the cylinder tube.

5. A reciprocating-piston device as claimed in claim 4, in which the said device includes a compressed gas distribution valve, and in which the said transfer passage has an upstream end connected to said distribution valve and has a downstream end leading into one end portion of the interior of the cylinder tube.

6. A reciprocating-piston device as claimed in claim 1, in which the moulded sleeve and the muffler are both made of polyurethane rubber.

7. A reciprocating-piston device as claimed in claim 1, which is a pneumatic percussive tool.

8. A reciprocating-piston device as claimed in any one of claims 2 to 5, in which the crests of the ribs lie in radially-locating engagement with the internal surface of the muffler along the whole of their lengths, and in which the said restriction is formed between opposite walls of an annular chamber defined within the muffler beyond the ends of the ribs, a part of said annular chamber on one side of said restriction chamber forming part of said first muffler chamber, and a part of said annular chamber on the other side of said restriction forming part of said second muffler chamber and communicating with said space bounded by said further pair of ribs.

9. A reciprocating-piston device as claimed in claim 8, in which the muffler wall includes a longitudinally-extending portion of increased depth which protrudes laterally inwardly into the second muffler chamber and is formed with an internal longitudinally-extending passage which opens at one end into the said space bounded by said further pair of ribs and leads at its other and downstream end to the muffler exhaust opening, the general direction of exhaust gas flow along the second muffler chamber being opposite to that along the said passage.

10. A reciprocating-piston device as claimed in claim 2, in which the ratio of the internal volume of the working end of the cylinder with the piston in its limiting position at the end of a working stroke (swept volume plus clearance volume) to the volumes of the first and second muffler chambers is in the range between 1:5:3 and 1:8:5, and the ratio of the total area of flow cross-section of the said gas discharge port(s) from the cylinder component to that of the restriction between the first and second muffler chambers and to that of the outlet from the second muffler chamber to atmosphere is in the range between 1:5:3 and 1:8:5.

11. A reciprocating-piston device as claimed in claim 10, in which the said ratio of volumes is approximately 1:7:3.6 and in which the said ratio of flow cross-sectional areas is approximately 1:8:4.

12. A reciprocating-piston device as set forth in claim 1 wherein said polymerized plastics material of said moulded outer sleeve comprises a natural rubber.

13. A reciprocating-piston device as set forth in claim 1 wherein said polymerized plastics material of said moulded tubular muffler comprises a natural rubber.

14. A reciprocating-piston device as set forth in claim 1 wherein said polymerized plastics material of said moulded outer sleeve comprises a synthetic plastics material.

15. A reciprocating-piston device as set forth in claim 1 wherein said polymerized plastics material of said moulded tubular muffler comprises a synthetic plastics material.

16. A reciprocating-piston device as set forth in claim 12 wherein said polymerized plastics material of said moulded tubular muffler comprises a natural rubber.

17. A reciprocating-piston device as set forth in claim 14 wherein said polymerized plastics material of said moulded tubular muffler comprises a synthetic plastics material.

* * * * *